Aug. 27, 1963

G. V. ZITO 3,102,199

MEANS FOR MEASURING AIR DENSITY AND ALTITUDE AT
PREVAILING LEVEL OF FLIGHT OF AN AIRCRAFT

Filed Jan. 14, 1959

TEMPERATURE PROBE WITH
RESISTOR ELEMENT VARIABLE
WITH AMBIENT TEMPERATURE

HELICAL
BI-METAL TYPE
TEMP. PROBE
SENSITIVE TO
THE AMBIENT
TEMP.

INVENTOR.
GEORGE V. ZITO
BY *Herbert L. Davis*

ATTORNEY

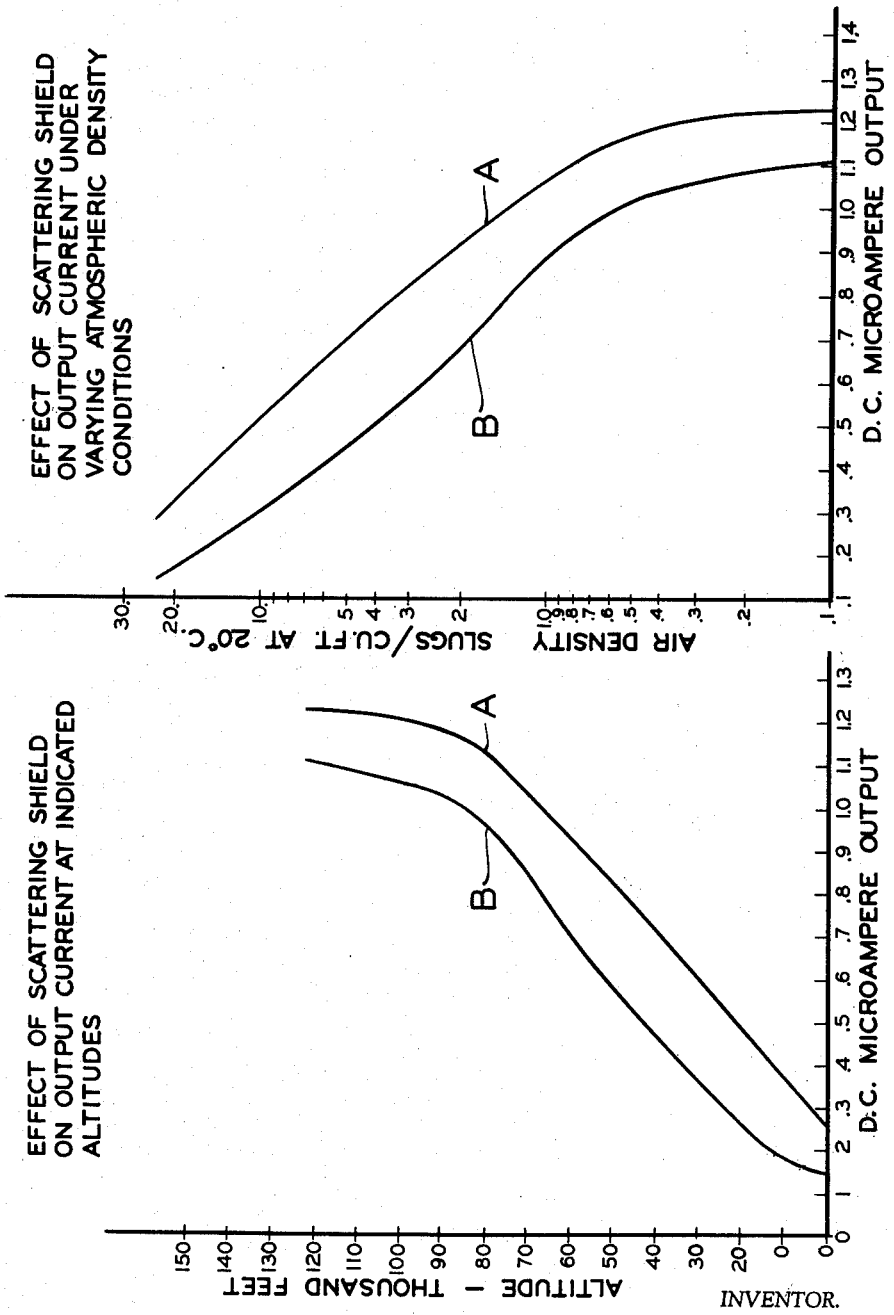

United States Patent Office 3,102,199
Patented Aug. 27, 1963

3,102,199
MEANS FOR MEASURING AIR DENSITY AND ALTITUDE AT PREVAILING LEVEL OF FLIGHT OF AN AIRCRAFT
George V. Zito, Northvale, N.J., assignor to The Bendix Corporation, a corporation of Delaware
Filed Jan. 14, 1959, Ser. No. 786,867
4 Claims. (Cl. 250—83.3)

The invention relates to improved means for measuring air density, and more particularly to a radiation densimeter for measuring the density of the air in the prevailing atmosphere at varying altitudes of, for example, from sea level to 120,000 feet above sea level and which means may be used as an altimeter upon applying appropriate temperature correction to the determined density.

A major difficulty in prior devices for deriving the altitude of an aircraft may be attributed to the lack of adequate instrumentation to measure directly the density of the atmospheric air at the level of flight of the aircraft, so that in such prior devices atmospheric temperature and pressure measurements are performed and the density of the air in the atmosphere at the level of flight of the aircraft approximated from such measurements.

An object of the invention is to provide improved means to measure directly the density of the air at the level of flight of the aircraft and by applying an appropriate temperature correction to such direct measurement more accurately determine the prevailing altitude of the aircraft.

Another object of the invention is to provide in a densimeter a chamber vented to the atmosphere and including at one end a Geiger-Mueller counter responsive to alpha, beta and gamma radiation emitted in a fixed ratio from a radium impregnated foil and another Geiger-Mueller counter at the opposite end of the chamber to correct the indication for gamma and cosmic rays, together with a hollow tube scatter shield in the form of a frustum of a cone having an effective internal surface of a material of good emissivity and having a tubular end of relatively large diameter positioned immediately before the radium impregnated foil while an opposite tubular end of smaller diameter is positioned immediately before the window of the first-mentioned Geiger-Mueller counter so as to cause by internal scattering of alpha radiations from the radiation emitter a direction of such radiations through the atmospheric air within the tubular cone in such a manner as to increase the path length of travel of the emitted radiations. Thus the shield serves to direct the radiated particles by internal scattering from the inner surface of the tube through the sampled atmospheric air toward the responsive Geiger-Mueller counter so as to effectively increase the slope of the response curve corresponding to the electrical current output from the responsive Geiger-Mueller counter at lower densities or higher altitudes of flight and hence extend the effective range of the instrument.

Another object of the invention is to provide a novel densimeter for indicating the density of the atmospheric air and including a scattering cone or shield for increasing the low density sensitivity.

Another object of the invention is to provide a novel densimeter for determining the density of the atmospheric air by passing limited alpha radiation through a sampled portion of the atmospheric air at the level of flight of an aircraft and correcting the determined density of the air for the prevailing temperature of the atmospheric air so as to provide an accurate indication of the pressure altitude of the aircraft.

These and other objects and features of the invention are pointed out in the following description in terms of the several embodiments thereof which are shown in the accompanying drawings. It is to be understood, however, that the drawings are for the purpose of illustration only and are not a definition of the limits of the invention, reference being had to the appended claims for this purpose.

In the drawings:

FIGURE 4 is a graph showing the output current from the device of FIGURE 1 at the indicated altitudes as corrected for ambient temperatures at such altitudes and in which the curve A has been plotted without the benefit of the tubular shield 8 being in the device, while curve B has been plotted with the tubular shield 8 in an operative relation, as shown in FIGURE 1.

Figure 1:
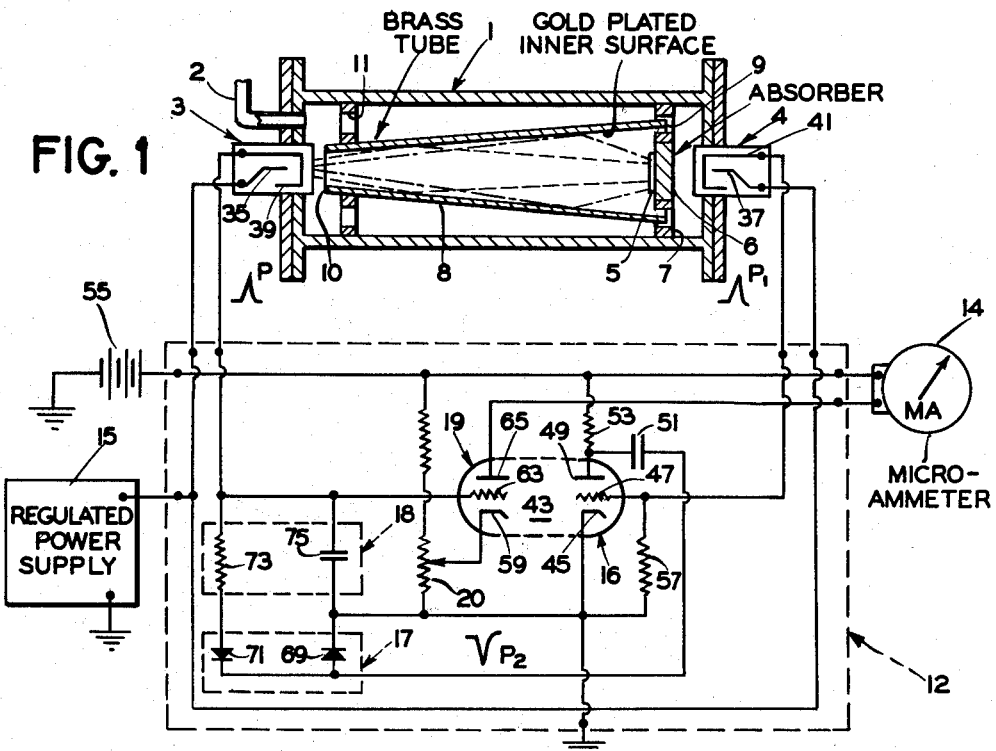
FIGURE 1 is a schematic wiring diagram of an electrical control system, together with a sectional view of a densimeter operative with the system to provide an electrical indication of the density of the ambient atmosphere at the level of flight of an aircraft.

FIGURE 5 is a graph showing the microampere output from the device of FIGURE 1 at the varying atmospheric density conditions sensed by the device in slugs per cubic centimeter of the sampled atmospheric air at 20 degrees centigrade and in which the curve A has been plotted without the benefit of the tubular shield 8 being in the device, while curve B has been plotted with the tubular shield 8 in an operative relation, as shown in FIGURE 1.

Referring to FIGURE 1, there is indicated by the numeral 1 an air-tight chamber or enclosure vented to the ambient atmosphere by a tubular conduit 2. The chamber 1 has provided at one end thereof a thin window Geiger-Mueller counter 3 and at an opposite end thereof a thin window Geiger-Mueller counter 4. The Geiger-Mueller counter 3 is responsive to alpha, beta and gamma rays and serves as a metering sensor, while the counter 4 serves to correct the counter 3 for gamma and cosmic rays, as will be explained hereinafter in greater detail.

Positioned in the chamber 1 near the counter 4 is a small piece of radium impregnated foil 5, such as supplied by U.S. Radium Corporation, which emits alpha, beta, and gamma rays in a fixed ratio. The foil 5 is located upon an absorber 6 which may be of a stainless steel type which will pass gamma rays while effectively absorbing both alpha and beta emissions. The chamber or enclosure 1 includes walls providing a shielding means for preventing entrance into the enclosure of radioactive radiation from a source external to the enclosure.

The absorber 6 is mounted within the chamber 1 by a suitable mounting member 7. Also carried by the member 7 in spaced relation to the chamber 1 is a hollow tubular scatter shield indicated by the numeral 8 and in the form of a frustum of a cone which has a larger diameter end 9 supported in the member 7 adjacent the foil 5. The tubular shield 8 terminates at an opposite smaller diameter end 10 directly before the window of counter 3. The smaller diameter end 10 of the scatter shield 8 is supported by a member 11 fixed in the chamber 1.

The scatter shield 8 may be formed of material such as brass having an effective inner surface or plating of a material having good emissivity such as copper, aluminum or gold. The scatter shield 8 leads from the foil 5, which serves as a radiation source, to the window of counter 3 and serves by internal scattering to cause the alpha particles supplied by the radiation emitter 5 to be scattered from within the tubular shield 8 at relatively short angles so as to continue to traverse the sampled air therein and be partially absorbed by such air until the remainder of the particles ultimately enter the counter 3.

The effect of cone 8 is to increase the length of the path traversed by the alpha particles through the sample atmospheric air to the Geiger-Mueller counter 3 and in turn to increase the sensitivity of the system controlled thereby at the relatively low atmospheric densities encountered at extremely high altitudes so as to extend the effective range of the instrument.

Suitable leads, as shown in FIGURE 1, are provided from the counters 3 and 4 to a totalizing circuit which may be of the type described and claimed in U.S. Patent No. 2,831,121, granted April 15, 1958, to George V. Zito for Apparatus for Detecting Alpha and Beta Rays.

The totalizing circuit 12 will subtract those pulses originating at counter 4 from those pulses originating from counter 3 to provide gamma and cosmic ray correction. The output from the circuit 12 passes through suitable leads to a micro-ammeter 14, the current indicated thereby being proportional to the average rate of arrival at counter 3 of alpha emissions. Gamma rays are detected by both counters 3 and 4 and hence do not contribute to the output current sensed by the micro-ammeter 14 which will in turn give an indication of a density of the sample air within the chamber 1, since the alpha emissions will be absorbed in passing through the gas or sampled air in an amount proportional to the gas density, as is well understood in the art.

In explanation of the totalizing circuit 12, it will be seen that the Geiger-Mueller counter 3 is sensitive to alpha, beta and gamma radiation (including cosmic rays) and produces positive pulses P of fixed amplitude in response thereto. Moreover, the second Geiger-Mueller counter 4 associated with Geiger-Mueller counter 3 and of identical geometry and sensitivity is shielded by the stainless steel absorber 6 from the alpha and beta radiations of the emitter 5 and is responsive only to gamma radiation (including cosmic rays).

The counter 4 produces positive pulses P' in response to gamma rays (including cosmic rays) and the pulses are inverted and amplified by a pulse inverter 16, as shown at $P_2$. The counters 3 and 4 preferably are energized by a regulated power supply 15 connected thereto.

A D.C. restorer 17 is connected to the pulse inverter 16 and receives the pulses $P_2$ therefrom. An integrator network 18 receives the pulse P from the Geiger-Mueller counter 3 and the pulses $P_2$ from D.C. restorer 17 and produces a D.C. potential having an amplitude corresponding to the difference in the number of pulses from counters 3 and 4. The counter 3 produces a positive pulse for each alpha, beta and gamma ray (including cosmic rays) and counter 4 produces a positive pulse for each gamma ray (including cosmic rays). The positive pulses from counter 4 are inverted to negative pulses and the resulting D.C. potential at the output of integrator 18 corresponds to the number of pulses due to alpha and beta particles.

The amplifier 19 is connected to integrator 18 and is controlled by the D.C. potential therefrom and, by an adjustable bias control 20, so that the amplifier 19 effectively energizes the micro-ammeter 14 connected in the output thereof to indicate the alpha-beta radiation.

The Geiger-Mueller counters 3, 4 are shown as having anodes 35, 37 and cathodes 39, 41, respectively. Anodes 35, 37 are connected in parallel to the regulated power supply 15.

Pulse inverter 16 comprises one half of a dual triode 43 having a cathode 45 connected to ground, a grid 47 connected to cathode 41 of counter 4, and an anode 49 connected through a blocking condenser 51 to D.C. restorer 17 and through a load resistor 53 to a plate potential source 55. A grid biasing resistor 57 is connected between grid 47 and cathode 45.

Amplifier 19 comprises the other half of dual triode 43 and includes a cathode 59 connected through adjustable biasing control resistor 20 to ground, a grid 63 connected to integrator 18 and to cathode 39 of counter 3, and an anode 65 connected through micro-ammeter or alpha-beta indicator 14 to plate potential source 55.

D.C. restorer 17 comprises a pair of diodes 69, 71, diode 69 being connected between coupling condenser 51 and ground and diode 71 being connected through a resistor 73 of integrator 18 to grid 63 of amplifier 19. Integrator 18 also includes a condenser 75 connected between grid 63 of amplifier 19 and ground in parallel with series connected resistor 73 and diodes 69, 71.

The arrangement described operates as follows:

When radioactive radiation from source 5 impinges upon signal counters 3 and 4, the counters originate positive pulses of substantially uniform amplitude and duration. Counter 3 provides a pulse P for each alpha, beta and gamma ray (including cosmic rays) impinging on its sensitive volume, and counter 4 provides a pulse P' for each gamma ray (including cosmic rays) impinging on its sensitive volume. As counter 3 discharges, electrons flow from ground through diodes 69, 71, in the low resistance direction, and resistor 73 to counter cathode 39 and counter anode 35 and through the regulated power supply 15 back to ground. The potential across resistor 73 and diodes 69, 71 in the low resistance direction provides a potential across condenser 75 and since condenser 75 cannot charge instantaneously, the potential on grid 63 rises exponentially in the positive direction. When the pulse has decayed, a net charge is deposited on condenser 75 and the electrons on the condenser plate at the grid side of the condenser tend to leak off through resistor 73 and diodes 69, 71 to equalize the charge on the other condenser plate, whereupon the potential on grid 63 decays exponentially. If counter 3 provides a second pulse before condenser 75 has fully discharged, the second pulse adds an additional charge on the condenser and the instantaneous voltage on grid 63 increases. The time constant of the integrating network 18 is greater than the average interval between pulses so that the average voltage developed across the network is proportional to the rate of occurrence of the pulses.

A positive pulse P' originating at counter 4 in response to gamma radiation (including cosmic rays) provides electron flow from ground through resistor 57 to counter cathode 41 and counter anode 37 and through power supply 15 back to ground. Grid 47 of pulse inverter 16 goes positive with current flow through resistor 57 and increases plate current flow through the tube. The potential drop across resistor 53 increases and lowers the plate potential so that the resulting amplified pulse $P^2$ in the plate circuit of pulse inverter 16 is negative with respect to ground. The negative pulse causes condenser 51 to lose some of its charge accumulated from plate potential source 55 and provides for electron current flow from the condenser through diode 69 in the high resistance direction and through diode 71 in the low resistance direction and through resistor 73. The resistance of diode 69 in the high resistance direction is greater than the sum of the resistance of resistor 73 and diode 71 in the low resistance direction and hence substantially the entire negative pulse appearing across diode 69 is impressed across condenser 75. The net voltage developed across condenser 75 is equal to the difference in the voltage produced by pulses from counters 3 and 4 and corresponds to alpha and beta radiation only. Additional gain of the gamma channel is required over the alpha, beta, gamma channel to compensate for the less efficient method of charging condenser 75.

The plate current from the amplifier 19 is applied to the micro-ammeter 14 and the current indicated thereby is proportional to the average rate of arrival at counter 3 of alpha and beta particles from the source 5 and passing through the atmospheric air within the shield 8 carried by the chamber 1. Gamma rays are detected by both counters 3 and 4 and hence do not contribute to the output current in the plate circuit of the amplifier 19.

Alpha particles will be partially absorbed upon passage through the atmospheric air or gaseous medium within the shield 8 in an amount proportional to the density of the sampled air therein, as is well understood in the art.

FIGURE 5 shows graphically by a curve A the output current from the device of FIGURE 1 without the shield 8, while there is shown by a curve B the output current from the device of FIGURE 1 under identical conditions of operation in which the atmospheric air sampled by the device has the designated density (rho) in slugs per cubic centimeter of the air. FIGURE 4 shows graphically by similar comparison curves A and B the output current for the varying densities of the air sampled at the designated altitudes upon the output current being corrected for the prevailing ambient atmospheric temperatures at such altitudes according to NACA tables or which may be corrected, for example, by ambient temperature responsive means, such as shown schematically in FIGURES 2 and 3, as hereinafter explained.

An examination of the graph of FIGURE 5 and comparison of the curve A with curve B will disclose a marked decrease in the slope of the curve A at lower densities as compared to the greater slope of the curve B plotted with the shield 8 in an operative relation.

The foregoing may be attributed to the fact that with the shield 8 not in an operative relation and removed from the chamber 1, the angle subtended by the metering counter 3 within the chamber 1 approaches saturation; that is, at the lower air density range the maximum number of alpha particles emitted by the source 5 are included in the line of sight of the metering counter 3 and are being sensed and indicated at the micro-ammeter 14.

The curve B, however, shown in FIGURE 5, plots the output current over the same low density range, but is taken with the scattering shield 8 in place, as shown in FIGURE 1. Improved slope at the lower density range of the curve B is to be noted, over that obtained without the scattering shield 8 in place, as in the curve A. The lower absolute value of the curve may be due to exclusion of many of the beta particles by insertion of the shield 8.

A similar comparison is to be noted in the graph of FIGURE 4 between the corresponding curves A and B from which it will be seen that the scattering shield 8 markedly increases the characteristic slope, and hence the sensitivity of the instrument as shown in FIGURE 4 by the curve B which has a decided measurable slope in the higher altitude range of, for example, from 100,000 feet to 120,000 feet, while with the shield 8 removed from the chamber 1 the slope of curve A is negligible in such higher altitude range.

The function of the scattering shield 8 may be understood by considering a particle emanating from the source 5 and traveling toward the counter 3. With the shield 8 in place the particle, as indicated schematically in FIGURE 1, by dotted lines, will be scattered from the shield inner wall surface of good emissivity at a relatively short angle and continue to traverse the sampled air therein so as to be partially absorbed thereby in proportion to the density of the air until the particles may ultimately enter the counter 3. Were the shield 8 not in place the particle would not be scattered back and forth from the inner wall surface thereof and the path of the particle from the source 5 to the counter 3 through the sampled air would be less subject to absorption thereby so that if the sampled air be of a density within the operated low density range the absorption thereof would be negligible so that there results a maximum output current, as shown by the curves A of FIGURES 4 and 5, with attendant lack of sensitivity over such low air density and high altitude ranges.

Thus the inclusion of the shield 8 increases the path length of the particles through the sampled atmospheric air within the tubular cone shaped shield 8, the effect of which is to increase the slope of the responsive curves B of FIGURES 4 and 5 at the critical low air density or high altitude ranges, and hence extend the effective range of the instrument.

Figure 2:
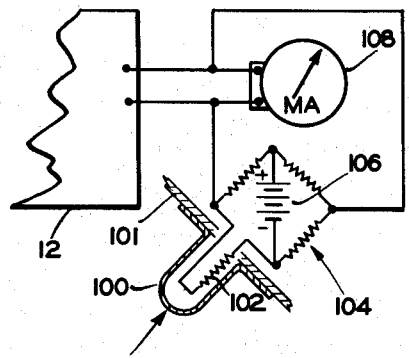
FIGURE 2 is a schematic view of a modified from of the invention, including a temperature probe with resistor element variable with ambient temperature at the level of flight of the aircraft and operative with the electrical control system and densimeter to correct the determined density of the ambient atmosphere so as to provide an indication of the altitude of the aircraft.

In the modified form of the invention illustrated by FIGURE 2, there is provided a temperature probe 100 suitably mounted on an aircraft member 101 so as to sense the static ambient temperature of the atmospheric air at the level of flight of the aircraft and including a resistor element 102 having a high temperature coefficient of resistance and connected in one arm of a bridge 104 of conventional type. A sourcee of electrical energy 106 is connected across an input to the bridge 104, while output lines lead from the bridge 104 to output lines from the totalizing circuit 12 which are in turn connected across a micro-ammeter 108 having an indicator pointer cooperating with suitable indicia to indicate the altitude of the aircraft.

The indicia dial of the micro-ammeter 108 may be initially adjusted relative to the indicator pointer by suitable manually operable means well-known in the altimeter art, as explained, for example, in U.S. Patent No. 2,366,566, granted January 2, 1945, to Paul F. Shivers and in which there is disclosed a device for the measurement of altitude including an adjustment means 23, shown in FIGURE 2 of the patent, for convenient manual adjustment of a conventional altitude dial scale with respect to an altitude indicator arm or hand 11. Thus, the indicia dial of the micro-ammeter 108 may be initially adjusted relative to the indicator pointer so as to correct for variations in the barometric pressure or air density from the standard condition at a given altitude level of, for example, sea level and after which correction the pointer may coincide with the correct indicia at the given altitude level, while at other altitude levels the indicator pointer of the micro-ammeter 108, as corrected for variations in the air density due to changes in the ambient atmospheric temperature, as hereinafter explained, will coincide with such initially adjusted indicia to indicate the altitude level then prevailing.

In effecting such temperature correction, the resistance of the temperature responsive element 102 varies with the ambient atmospheric temperature so as to unbalance the bridge 104 in a sense dependent upon whether the ambient temperature is above or below a predetermined value at which the bridge 104 is balanced. The element 102 therein effectively controls the bridge 104 and the bias applied thereby to the lines leading to the micro-ammeter 108 from the output of the totalizing circuit 12 so that the output current in these lines, which is normally proportional to the density of the sampled atmospheric air, is corrected for the prevailing static ambient atmospheric temperature so that the micro-ammeter 106 may provide a more accurate indication of the altitude of the aircraft.

Figure 3:
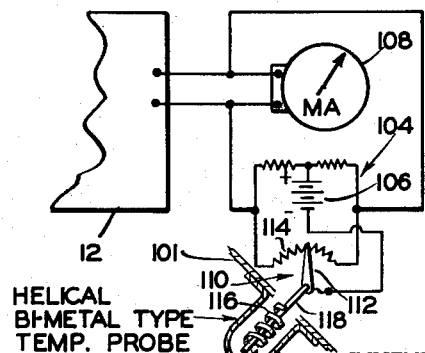
FIGURE 3 is a schematic view of another modified form of the invention in which there is included a helical bi-metal temperature probe sensitive to the ambient temperature at the level of flight of the aircraft and operative with the electrical control system and densimeter to correct the determined density of the ambient atmosphere so as to provide an indication of the altitude of the aircraft.

In the modified form of the invention illustrated in FIG. 3, in place of the temperature responsive resistor element 102 of FIG. 2, there is provided a potentiometer 110 having an adjustable contact member 112 cooperating with a resistor element 114 which provides opposite arms of the bridge 104. A thermostat 116 including a helical thermostatic element of conventional type may project into the probe 100 so as to be responsive to the prevailing static ambient temperature. The thermostat 116 may effect a rotation of a shaft 118 upon a change in the ambient atmospheric temperature so as to effect an adjustment of the contact member 112 to unbalance the bridge 104 and apply a corrective bias to the micro-ammeter 108. The output current from the totalizing circuit 12 to the micro-ammeter 108 and which is normally proportional to the density of the sampled atmospheric air, may be thereby corrected for changes in the ambient amtospheric temperature so that the micro-ammeter 108 responsive thereto may more accurately indicate the altitude of the aircraft.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. The combination comprising an enclosure, means for supplying sampled ambient atmospheric air to within the enclosure, a radium impregnated member positioned within said enclosure, said radium impregnated member to emit alpha, beta and gamma particles in a fixed ratio for passage through sampled atmospheric air within the enclosure, first and second counters adapted to provide electrical pulses in response to the particles emitted from said member and passing through the air within the enclosure, said particles being partially absorbed by the air in proportion to the density thereof, the first of said counters being responsive to alpha, beta and gamma particles, said first counter being positioned in said enclosure in spaced relation to said radium impregnated member and at one side thereof, the second of said counters being responsive to gamma particles, said second counter being positioned in said enclosure in spaced relation to said radium impregnated member and at another side thereof, means between said member and said second counter to prevent the passage of alpha and beta particles to said second counter, means to scatter radiated particles from said member through the air in said enclosure and toward said first counter, a pulse inverter connected to one of said counters for inverting the pulses therefrom, integrating means connected to the other of said counters and to said inverter for providing a D.C. potential corresponding to the pulse difference from said counters, current control means operatively associated with said integrating means and controlled by said D.C. potential, means for measuring electric current, an indicator means operated by said current measuring means, means operatively connecting said control means to said current measuring means for causing operation of the current measuring means and thereby the indicator means as a function of the density of the air in said enclosure.

2. The combination defined by claim 1 in which said means to scatter radiated particles from said member includes a tubular member in the form of a frustum of a cone having opposite tubular ends, one of said tubular ends being of a diameter larger than the diameter of the other of said tubular ends, said one tubular end being positioned about the radium impregnated member and said other tubular end opening immediately before the first counter, said tubular member having an inner surface of a material of good emissivity to cause particles emitted from said radium impregnated member to be scattered thereby through the sampled atmospheric air therein so as to effectively increase the length of the path traversed by the emitted particles through the sampled atmospheric air and toward the first counter and thereby provide increased sensitivity within a low atmospheric air density range.

3. In a device of the class described, an enclosure, means for supplying sampled ambient atmospheric air to within the enclosure, a radium impregnated member positioned within said enclosure, said radium impregnated member to emit alpha, beta and gamma particles in a fixed ratio for passage through sampled atmospheric air within the enclosure, first and second counters adapted to provice electrical pulses in response to the particles emitted from said member and passing through the air within the enclosure, said particles being partially absorbed by the air in proportion to the density thereof, the first of said counters being responsive to alpha, beta and gamma particles, said first counter being positioned in said enclosure in spaced relation to said radium impregnated member and at one side thereof, the second of said counters being responsive to gamma particles, said second counter being positioned in said enclosure in spaced relation to said radium impregnated member and at another side thereof, means between said member and said second counter to prevent the passage of alpha and beta particles to said second counter, means to scatter radiated particles from said member through the air in said enclosure and toward said first counter, a pulse inverter connected to one of said counters for inverting the pulses therefrom, integrating means connected to the other of said counters and to said inverter for providing a D.C. potential corresponding to the pulse difference from said counters, current control means operatively associated with said integrating means and controlled by said D.C. potential, means for measuring electric current, an indicator means operated by said current measuring means, means operatively connecting said control means to said current measuring means for causing operation of the current measuring means and thereby the indicator means as a function of the density of the air in said enclosure, and ambient atmospheric air temperature responsive means for electrically biasing said current measuring means so as to cause the operation of the indicator means to be adjusted for changes in the temperature of the ambient atmospheric air in such a manner as to cause said indicator means to provide an indication of the prevailing altitude.

4. The combination defined by claim 3 in which said shielding means includes a tubular member in the form of a frustum of a cone having opposite tubular ends, one of said tubular ends being of a diameter larger than the diameter of the other of said tubular ends, said one tubular end being positioned about the radium impregnated member and said other tubular end opening immediately before the first counter, said tubular member having an inner surface of a material of good emissivity to cause particles emitted from said radium impregnated member to be scattered thereby through the sampled atmospheric air therein so as to effectively increase the length of the path traversed by the emitted particles through the sampled atmospheric air and toward the first counter and thereby provide increased sensitivity within a low atmospheric air density range.

References Cited in the file of this patent

UNITED STATES PATENTS

| | | |
|---|---|---|
| 2,562,968 | Teichmann et al. | Aug. 7, 1951 |
| 2,573,823 | Barghausen et al. | Nov. 6, 1951 |
| 2,617,945 | Lord et al. | Nov. 11, 1952 |
| 2,641,710 | Pompeo et al. | June 9, 1953 |
| 2,744,697 | Van Allen | May 8, 1956 |
| 2,831,121 | Zito | Apr. 15, 1958 |
| 2,879,398 | Garrison | Mar. 24, 1959 |
| 2,908,819 | Marx | Oct. 13, 1959 |